(12) United States Patent
Minear et al.

(10) Patent No.: US 10,009,743 B2
(45) Date of Patent: *Jun. 26, 2018

(54) SYSTEM AND METHOD FOR PROVIDING SUBSCRIBED APPLICATIONS ON WIRELESS DEVICES OVER A WIRELESS NETWORK

(75) Inventors: Brian Minear, San Diego, CA (US); Richard Wayne Gardner, III, Solana Beach, CA (US); Stephen A. Sprigg, Poway, CA (US); Phil Tien Nguyen, San Diego, CA (US); Mitchell B. Oliver, San Diego, CA (US); Eric J. Lekven, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2276 days.

This patent is subject to a terminal disclaimer.

(21) Appl. No.: 11/349,380

(22) Filed: Feb. 6, 2006

(65) Prior Publication Data

US 2006/0173758 A1 Aug. 3, 2006

Related U.S. Application Data

(63) Continuation of application No. 09/929,220, filed on Aug. 13, 2001, now Pat. No. 6,996,537.

(51) Int. Cl.
*H04W 4/24* (2018.01)
*G06Q 30/02* (2012.01)
(Continued)

(52) U.S. Cl.
CPC ............. *H04W 4/24* (2013.01); *G06Q 30/02* (2013.01); *G06Q 30/0601* (2013.01);
(Continued)

(58) Field of Classification Search
CPC ..... G06Q 30/02; G06Q 30/0601; H04W 4/24; H04M 15/00
(Continued)

(56) References Cited

U.S. PATENT DOCUMENTS 628,294 A 7/1899 Ira
4,156,903 A 5/1979 Barton et al.
(Continued)

FOREIGN PATENT DOCUMENTS

CA 2267549 A1 9/2000
CA 2363220 A1 5/2003
(Continued)

OTHER PUBLICATIONS

Goldenberg-Hart, Diane, "A Glossary of Selected Internet and Computing Terms," Yale University Library, Jun. 1996. Retrieved from http://www.library.yale.edu/ref/internet/intgloss.htm.
(Continued)

*Primary Examiner* — Naeem U Haq
(74) *Attorney, Agent, or Firm* — Muncy, Geissler, Olds & Lowe, P.C.

(57) ABSTRACT

A system and method for the provision of downloadable subscription-based software applications to one or more wireless devices where the applications are downloadable from one or more application download servers across a wireless network. An accounting module receives subscription-based application download data from the one or more application download servers for each subscription-based application downloaded by a wireless device, and subscription-based application deletion data from each wireless device that has deleted a subscription-based application. The accounting module accounts for the use of the subscribed
(Continued)

software applications based upon the subscription-based software application download data and subscription-based application deletion data.

29 Claims, 4 Drawing Sheets

(51) Int. Cl.
  *G06Q 30/06* (2012.01)
  *H04M 15/00* (2006.01)
  *G06Q 40/00* (2012.01)

(52) U.S. Cl.
  CPC ............ *G06Q 40/12* (2013.12); *H04M 15/00* (2013.01); *H04M 15/51* (2013.01); *H04M 2215/54* (2013.01)

(58) Field of Classification Search
  USPC ............ 705/26, 27, 26.1, 26.2, 26.25, 26.3, 705/26.35, 26.4, 26.41–26.44, 26.5, 705/26.61–26.64, 26.7, 26.8, 26.81, 705/26.82, 26.9, 27.1, 27.2
  See application file for complete search history.

(56) References Cited

U.S. PATENT DOCUMENTS

| | | | |
|---|---|---|---|
| 4,528,589 A * | 7/1985 | Block et al. ................. 380/241 |
| 4,975,942 A | 12/1990 | Zebryk |
| 5,005,122 A | 4/1991 | Griffin et al. |
| 5,013,897 A * | 5/1991 | Harman et al. ............... 235/381 |
| 5,329,619 A | 7/1994 | Page et al. |
| 5,564,070 A | 10/1996 | Want et al. |
| 5,608,781 A | 3/1997 | Seiderman |
| 5,619,247 A | 4/1997 | Russo |
| 5,634,012 A | 5/1997 | Stefik et al. |
| 5,666,293 A | 9/1997 | Metz et al. |
| 5,666,397 A | 9/1997 | Lamons et al. |
| 5,761,485 A | 6/1998 | Munyan |
| 5,812,533 A | 9/1998 | Cox et al. |
| 5,812,988 A | 9/1998 | Sandretto |
| 5,845,267 A | 12/1998 | Ronen |
| 5,852,812 A | 12/1998 | Reeder |
| 5,857,201 A | 1/1999 | Wright, Jr. et al. |
| 5,907,837 A | 5/1999 | Ferrel et al. |
| 5,940,752 A | 8/1999 | Henrick |
| 5,956,034 A | 9/1999 | Sachs et al. |
| 5,970,490 A | 10/1999 | Morgenstern |
| 5,986,690 A | 11/1999 | Hendricks |
| 6,014,641 A * | 1/2000 | Loeb et al. ..................... 705/34 |
| 6,035,281 A | 3/2000 | Crosskey et al. |
| 6,047,051 A | 4/2000 | Ginzboorg et al. |
| 6,088,717 A | 7/2000 | Reed et al. |
| 6,141,404 A | 10/2000 | Westerlage et al. |
| 6,151,606 A | 11/2000 | Mendez |
| 6,181,704 B1 | 1/2001 | Drottar et al. |
| 6,185,198 B1 | 2/2001 | LaDue |
| 6,185,683 B1 | 2/2001 | Gitner et al. |
| 6,202,051 B1 | 3/2001 | Woolston |
| 6,202,054 B1 | 3/2001 | Lawlor et al. |
| 6,226,618 B1 | 5/2001 | Downs et al. |
| 6,230,168 B1 | 5/2001 | Unger et al. |
| 6,230,269 B1 | 5/2001 | Spies et al. |
| 6,253,189 B1 | 6/2001 | Feezell et al. |
| 6,253,239 B1 | 6/2001 | Shklar et al. |
| 6,253,326 B1 | 6/2001 | Lincke et al. |
| 6,263,326 B1 | 7/2001 | Chandra |
| 6,263,362 B1 | 7/2001 | Donoho et al. |
| 6,266,401 B1 | 7/2001 | Marchbanks et al. |
| 6,269,157 B1 | 7/2001 | Coyle |
| 6,282,294 B1 | 8/2001 | Deo et al. |
| 6,311,223 B1 | 10/2001 | Bodin et al. |
| 6,321,078 B1 | 11/2001 | Menelli et al. |
| 6,324,565 B1 | 11/2001 | Holt, III |
| 6,327,574 B1 | 12/2001 | Kramer et al. |
| 6,334,114 B1 | 12/2001 | Jacobs et al. |
| 6,334,116 B1 | 12/2001 | Ganesan et al. |
| 6,336,137 B1 | 1/2002 | Lee et al. |
| 6,343,318 B1 | 1/2002 | Hawkins et al. |
| 6,366,893 B2 | 4/2002 | Hannula et al. |
| 6,381,325 B1 | 4/2002 | Hanson |
| 6,389,464 B1 | 5/2002 | Krishnamurthy et al. |
| 6,427,076 B2 | 7/2002 | Skog |
| 6,434,535 B1 | 8/2002 | Kupka et al. |
| 6,453,160 B1 | 9/2002 | Thomas et al. |
| 6,460,076 B1 | 10/2002 | Srinivasan |
| 6,463,534 B1 | 10/2002 | Geiger et al. |
| 6,493,722 B1 | 12/2002 | Daleen et al. |
| 6,535,726 B1 | 3/2003 | Johnson |
| 6,549,770 B1 | 4/2003 | Marran |
| 6,597,903 B1 | 7/2003 | Dahm et al. |
| 6,598,026 B1 | 7/2003 | Ojha et al. |
| 6,606,744 B1 | 8/2003 | Mikurak |
| 6,622,017 B1 | 9/2003 | Hoffman |
| 6,628,934 B2 | 9/2003 | Rosenberg et al. |
| 6,665,711 B1 | 12/2003 | Boyle et al. |
| 6,683,941 B2 | 1/2004 | Brown et al. |
| 6,704,716 B1 | 3/2004 | Force |
| 6,721,716 B1 | 4/2004 | Gross |
| 6,741,980 B1 | 5/2004 | Langseth et al. |
| 6,742,043 B1 | 5/2004 | Moussa et al. |
| 6,754,320 B2 | 6/2004 | Daase et al. |
| 6,757,710 B2 | 6/2004 | Reed |
| 6,792,271 B1 | 9/2004 | Sherman et al. |
| 6,792,280 B1 | 9/2004 | Hori et al. |
| 6,816,721 B1 | 11/2004 | Rudisill |
| 6,820,121 B1 | 11/2004 | Callis et al. |
| 6,829,593 B1 | 12/2004 | Ritter et al. |
| 6,857,067 B2 | 2/2005 | Edelman |
| 6,873,936 B2 | 3/2005 | Reed et al. |
| 6,880,750 B2 | 4/2005 | Pentel |
| 6,883,142 B2 | 4/2005 | Shimamoto et al. |
| 6,928,441 B2 | 8/2005 | Haegele |
| 6,937,996 B1 | 8/2005 | Forsythe et al. |
| 6,941,139 B1 | 9/2005 | Shupe et al. |
| 6,941,270 B1 | 9/2005 | Hannula |
| 6,954,793 B2 | 10/2005 | Ramaswamy et al. |
| 6,957,793 B2 | 10/2005 | Gautier et al. |
| 6,965,883 B2 | 11/2005 | Xu et al. |
| 6,978,273 B1 | 12/2005 | Bonneau et al. |
| 6,985,882 B1 | 1/2006 | Del Sesto |
| 6,996,537 B2 | 2/2006 | Minear et al. |
| 7,010,303 B2 | 3/2006 | Lewis et al. |
| 7,010,500 B2 | 3/2006 | Aarnio |
| 7,013,289 B2 | 3/2006 | Horn et al. |
| 7,020,688 B2 | 3/2006 | Sykes, Jr. |
| 7,039,389 B2 | 5/2006 | Johnson et al. |
| 7,043,447 B2 | 5/2006 | Hughes et al. |
| 7,047,405 B2 | 5/2006 | Mauro |
| 7,068,680 B1 | 6/2006 | Kaltenmark et al. |
| 7,099,891 B2 | 8/2006 | Harris et al. |
| 7,113,766 B2 | 9/2006 | Horel et al. |
| 7,117,504 B2 | 10/2006 | Smith et al. |
| 7,155,205 B2 | 12/2006 | Cerami et al. |
| 7,177,837 B2 | 2/2007 | Pegaz-Paquet et al. |
| 7,184,747 B2 | 2/2007 | Bogat |
| 7,200,566 B1 | 4/2007 | Moore et al. |
| 7,206,842 B2 | 4/2007 | Nainani et al. |
| 7,218,917 B2 | 5/2007 | Pradhan et al. |
| 7,228,333 B1 | 6/2007 | Smith |
| 7,233,790 B2 | 6/2007 | Kjellberg et al. |
| 7,260,194 B1 | 8/2007 | Meyers et al. |
| 7,269,654 B2 | 9/2007 | Srinivas |
| 7,278,164 B2 | 10/2007 | Raiz et al. |
| 7,286,655 B2 | 10/2007 | Voorman et al. |
| 7,293,099 B1 | 11/2007 | Kalajan |
| 7,334,025 B2 | 2/2008 | Kuriya |
| 7,362,745 B1 | 4/2008 | Cope et al. |
| 7,370,120 B2 | 5/2008 | Kirsch et al. |
| 7,404,148 B2 | 7/2008 | Lincke et al. |
| 7,415,439 B2 * | 8/2008 | Kontio et al. ................. 705/53 |
| 7,436,816 B2 | 10/2008 | Mehta et al. |
| 7,444,411 B2 | 10/2008 | Sung |

(56) References Cited

U.S. PATENT DOCUMENTS

| | | |
|---|---|---|
| 7,467,198 B2 | 12/2008 | Goodman et al. |
| 7,490,045 B1* | 2/2009 | Flores et al. ............... 705/1.1 |
| 7,526,450 B2 | 4/2009 | Hughes et al. |
| 7,574,377 B2 | 8/2009 | Carapelli |
| 7,577,616 B2 | 8/2009 | Zhu |
| 7,583,953 B2 | 9/2009 | Choi et al. |
| 7,660,755 B2 | 2/2010 | Amato et al. |
| 7,711,680 B2 | 5/2010 | Barnes-Leon et al. |
| 7,752,217 B2 | 7/2010 | Sawashima et al. |
| 7,894,803 B2* | 2/2011 | Kamada ............... 455/414.3 |
| 7,904,528 B2* | 3/2011 | Zilliacus et al. ........... 709/217 |
| 7,907,937 B2 | 3/2011 | Engelhart |
| 8,028,056 B1 | 9/2011 | Krishna et al. |
| 8,150,736 B2 | 4/2012 | Horn et al. |
| 8,489,470 B2 | 7/2013 | Kahlon et al. |
| 9,143,622 B2 | 9/2015 | Sprigg et al. |
| 2001/0013020 A1 | 8/2001 | Yoshida et al. |
| 2001/0019604 A1 | 9/2001 | Joyce et al. |
| 2001/0032254 A1 | 10/2001 | Hawkins |
| 2001/0034686 A1 | 10/2001 | Eder |
| 2001/0036271 A1 | 11/2001 | Javed |
| 2001/0037304 A1 | 11/2001 | Paiz |
| 2001/0056362 A1 | 12/2001 | Hanagan et al. |
| 2002/0002603 A1 | 1/2002 | Vange |
| 2002/0004935 A1 | 1/2002 | Huotari et al. |
| 2002/0019764 A1 | 2/2002 | Mascarenhas |
| 2002/0022472 A1 | 2/2002 | Watler et al. |
| 2002/0022971 A1* | 2/2002 | Tanaka et al. ................ 705/1 |
| 2002/0029197 A1 | 3/2002 | Kailamaki et al. |
| 2002/0029200 A1 | 3/2002 | Dulin et al. |
| 2002/0035688 A1 | 3/2002 | Kutaragi et al. |
| 2002/0035699 A1 | 3/2002 | Crosbie |
| 2002/0049717 A1 | 4/2002 | Routtenberg et al. |
| 2002/0052754 A1 | 5/2002 | Joyce et al. |
| 2002/0052968 A1 | 5/2002 | Bonefas et al. |
| 2002/0062290 A1 | 5/2002 | Ricci |
| 2002/0069176 A1 | 6/2002 | Newman |
| 2002/0069244 A1 | 6/2002 | Blair et al. |
| 2002/0069263 A1* | 6/2002 | Sears et al. ................ 709/218 |
| 2002/0071559 A1 | 6/2002 | Christensen et al. |
| 2002/0083006 A1 | 6/2002 | Headings et al. |
| 2002/0083050 A1 | 6/2002 | Liu et al. |
| 2002/0107706 A1 | 8/2002 | Oliver et al. |
| 2002/0107795 A1 | 8/2002 | Minear et al. |
| 2002/0107809 A1 | 8/2002 | Biddle et al. |
| 2002/0109706 A1 | 8/2002 | Lincke et al. |
| 2002/0111904 A1 | 8/2002 | Gruber et al. |
| 2002/0128908 A1 | 9/2002 | Levin et al. |
| 2002/0129165 A1 | 9/2002 | Dingsor et al. |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0165822 A1 | 11/2002 | Makipaa |
| 2002/0176553 A1 | 11/2002 | Aschir |
| 2002/0194143 A1* | 12/2002 | Banerjee et al. ............. 705/400 |
| 2003/0005136 A1 | 1/2003 | Eun |
| 2003/0023550 A1 | 1/2003 | Lee |
| 2003/0028903 A1 | 2/2003 | Hofrichter et al. |
| 2003/0046396 A1 | 3/2003 | Richter et al. |
| 2003/0051047 A1 | 3/2003 | Horel et al. |
| 2003/0060188 A1 | 3/2003 | Gidron et al. |
| 2003/0074328 A1 | 4/2003 | Schiff et al. |
| 2003/0078844 A1 | 4/2003 | Takatori et al. |
| 2003/0078886 A1 | 4/2003 | Minear et al. |
| 2003/0078895 A1 | 4/2003 | MacKay |
| 2003/0083973 A1 | 5/2003 | Horsfall |
| 2003/0083991 A1 | 5/2003 | Kikinis |
| 2003/0093461 A1 | 5/2003 | Suzuki et al. |
| 2003/0093565 A1 | 5/2003 | Berger et al. |
| 2003/0096591 A1 | 5/2003 | Pohutsky et al. |
| 2003/0110044 A1 | 6/2003 | Nix et al. |
| 2003/0110213 A1 | 6/2003 | Munetsugu |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0208444 A1 | 11/2003 | Sauer |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0006517 A1* | 1/2004 | Takatori ................... 705/26 |
| 2004/0015413 A1 | 1/2004 | Abu-Hejleh et al. |
| 2004/0015562 A1 | 1/2004 | Harper et al. |
| 2004/0030601 A1 | 2/2004 | Pond et al. |
| 2004/0043753 A1 | 3/2004 | Wake et al. |
| 2004/0044623 A1 | 3/2004 | Wake et al. |
| 2004/0137890 A1 | 7/2004 | Kalke |
| 2004/0139012 A1 | 7/2004 | Koskinen et al. |
| 2004/0181591 A1 | 9/2004 | Yu et al. |
| 2004/0267630 A1 | 12/2004 | Au et al. |
| 2005/0086348 A1 | 4/2005 | Balassanian |
| 2005/0090258 A1 | 4/2005 | Coppinger et al. |
| 2005/0113092 A1 | 5/2005 | Coppinger et al. |
| 2005/0114155 A1 | 5/2005 | Hodges et al. |
| 2005/0125315 A1 | 6/2005 | Munoz et al. |
| 2005/0132049 A1 | 6/2005 | Inoue et al. |
| 2005/0148319 A1 | 7/2005 | Himeno |
| 2005/0192878 A1 | 9/2005 | Minear et al. |
| 2005/0289047 A1 | 12/2005 | Oliver et al. |
| 2006/0014535 A1 | 1/2006 | Walker et al. |
| 2006/0080232 A1 | 4/2006 | Epps |
| 2006/0143119 A1 | 6/2006 | Krueger et al. |
| 2006/0235931 A1 | 10/2006 | Ruthe et al. |
| 2006/0253350 A1 | 11/2006 | Falkenhain et al. |
| 2006/0270386 A1 | 11/2006 | Yu et al. |
| 2006/0271449 A1 | 11/2006 | Oliver et al. |
| 2007/0003034 A1 | 1/2007 | Schultz et al. |
| 2007/0038703 A1 | 2/2007 | Tendjoukian et al. |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0169163 A1 | 7/2007 | Morio et al. |
| 2007/0174308 A1 | 7/2007 | Rausch |
| 2007/0197189 A1 | 8/2007 | Horel et al. |
| 2011/0030042 A1 | 2/2011 | Neal-Joslin |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1147325 A | 4/1997 |
| CN | 1459183 A | 11/2003 |
| EP | 0780802 A2 | 6/1997 |
| EP | 0895148 | 2/1999 |
| EP | 1026610 A2 | 8/2000 |
| EP | 1026853 A1 | 8/2000 |
| EP | 1033652 A2 | 9/2000 |
| EP | 1047030 A2 | 10/2000 |
| EP | 1102191 | 5/2001 |
| EP | 1122967 A2 | 8/2001 |
| EP | 1162807 | 12/2001 |
| EP | 1204025 A2 | 5/2002 |
| EP | 1204054 A2 | 5/2002 |
| EP | 1403797 A1 | 3/2004 |
| EP | 1404100 A1 | 3/2004 |
| EP | 1414185 A2 | 4/2004 |
| FR | 2775550 | 9/1999 |
| GB | 2349548 | 11/2000 |
| JP | 07044261 | 2/1995 |
| JP | 2007-319691 | 8/1995 |
| JP | 07319691 A | 12/1995 |
| JP | 09-319573 * | 12/1997 |
| JP | 9-319573 | 12/1997 |
| JP | 1066050 | 3/1998 |
| JP | 10-260873 | 5/1998 |
| JP | 10-140283 | 9/1998 |
| JP | 10262059 A | 9/1998 |
| JP | 11053185 A | 2/1999 |
| JP | 11055252 A | 2/1999 |
| JP | 11-069017 | 3/1999 |
| JP | 11126188 A | 5/1999 |
| JP | H11203127 A | 7/1999 |
| JP | 2000-56967 | 2/2000 |
| JP | 2000078129 A | 3/2000 |

(56) References Cited

FOREIGN PATENT DOCUMENTS

| | | |
|---|---|---|
| JP | 2000505568 A | 5/2000 |
| JP | 2000357196 A | 12/2000 |
| JP | 2001195451 A | 7/2001 |
| JP | 2001202434 A | 7/2001 |
| JP | 2001-250069 | 9/2001 |
| JP | 2001-312324 | 9/2001 |
| JP | 2001243382 A | 9/2001 |
| JP | 2001265938 | 9/2001 |
| JP | 2001268623 A | 9/2001 |
| JP | 2001-320509 | 11/2001 |
| JP | 2001312666 A | 11/2001 |
| JP | 2001319168 A | 11/2001 |
| JP | 2001325234 | 11/2001 |
| JP | 2001340656 A | 12/2001 |
| JP | 2001352583 | 12/2001 |
| JP | 2002007839 A | 1/2002 |
| JP | 2002015160 A | 1/2002 |
| JP | 2002-027151 | 2/2002 |
| JP | 2002-91850 | 3/2002 |
| JP | 2002093361 A | 3/2002 |
| JP | 2002094450 A | 3/2002 |
| JP | 2002101315 A | 4/2002 |
| JP | 2002109395 A | 4/2002 |
| JP | 2002-099289 | 5/2002 |
| JP | 2002-99441 | 5/2002 |
| JP | 2002132367 | 5/2002 |
| JP | 2002133316 A | 5/2002 |
| JP | 2002-175387 | 6/2002 |
| JP | 2002163258 | 6/2002 |
| JP | 2002163467 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002345030 A | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2005537544 | 12/2005 |
| JP | 2006505966 A | 2/2006 |
| JP | 2006520173 | 8/2006 |
| JP | 2007527570 A | 9/2007 |
| JP | 2008514743 A | 5/2008 |
| JP | 2010178027 A | 8/2010 |
| KR | 2000-72521 | 12/2000 |
| KR | 20010078968 | 8/2001 |
| KR | 20020039648 | 5/2002 |
| KR | 2003-0042660 | 6/2003 |
| KR | 102003005056 | 6/2003 |
| KR | 20030078446 | 10/2003 |
| KR | 1020040019840 | 3/2004 |
| RU | 2165679 | 4/2001 |
| RU | 2169437 C1 | 6/2001 |
| RU | 2191482 | 10/2002 |
| RU | 2212057 | 9/2003 |
| RU | 2232483 C2 | 7/2004 |
| RU | 2298225 | 4/2007 |
| TW | 161301 | 6/1991 |
| TW | 388021 | 4/2000 |
| TW | 466858 | 12/2001 |
| TW | 499645 | 8/2002 |
| WO | WO9308545 A1 | 4/1993 |
| WO | 9703410 A1 | 1/1997 |
| WO | WO-9726739 A1 | 7/1997 |
| WO | 9745814 | 12/1997 |
| WO | WO9821676 | 5/1998 |
| WO | 9931610 | 6/1999 |
| WO | 9941861 A1 | 8/1999 |
| WO | 9952077 | 10/1999 |
| WO | 9960801 A1 | 11/1999 |
| WO | WO-0002112 A2 | 1/2000 |
| WO | WO0031672 A1 | 6/2000 |
| WO | WO-0043962 A1 | 7/2000 |
| WO | 0056033 | 9/2000 |
| WO | 0079451 | 12/2000 |
| WO | 0103410 A1 | 1/2001 |
| WO | 0118694 A2 | 3/2001 |
| WO | WO-0143390 A2 | 6/2001 |
| WO | 0150305 A2 | 7/2001 |
| WO | WO-0149048 A1 | 7/2001 |
| WO | 0163900 A1 | 8/2001 |
| WO | WO0163532 | 8/2001 |
| WO | 0169891 | 9/2001 |
| WO | 0197104 | 12/2001 |
| WO | 0203219 A1 | 1/2002 |
| WO | 0231718 | 4/2002 |
| WO | WO0244892 A2 | 6/2002 |
| WO | 02063537 | 8/2002 |
| WO | 02067600 | 8/2002 |
| WO | WO02063536 A2 | 8/2002 |
| WO | WO-02073934 A2 | 9/2002 |
| WO | WO-02093361 A1 | 11/2002 |
| WO | WO-02103459 A2 | 12/2002 |
| WO | 03017171 A1 | 2/2003 |
| WO | WO-03032618 A1 | 4/2003 |
| WO | 03050743 A1 | 6/2003 |
| WO | 03075584 A2 | 9/2003 |
| WO | 03079256 A1 | 9/2003 |
| WO | WO-03085943 A1 | 10/2003 |
| WO | 2004003708 A2 | 1/2004 |
| WO | WO2004021131 A2 | 3/2004 |
| WO | 2004084526 A2 | 9/2004 |
| WO | WO2004082245 | 9/2004 |
| WO | 2005004456 | 1/2005 |
| WO | 2005008383 A2 | 1/2005 |
| WO | WO2005020027 A2 | 3/2005 |
| WO | WO-05069917 | 8/2005 |
| WO | 2006130539 A2 | 12/2006 |

OTHER PUBLICATIONS

No Author, "AvantGo 4.0 Powers Wireless Applications and Services," Customer Inter@ction Solutions, May 2001, vol. 19, Issue 11, p. 71.

No Author, "Sony Pictures to Sell Movies via Internet," Jul. 9, 2001, Source: Japan Computer Industry Scan.

Rigdon, Joan E., "CyberSource Begins to Offer Software of Symantec and Others on the Internet," Wall Street Journal, Jan. 31, 1995.

"SyncML Represntation Protocol, Version 1.0" SyncML Representation Protocol, (Dec. 7, 2000), pp. 1-104, Chapters 1-4.

Arar, Yardena, "Download apps to a phone," PC World, Jun. 2002, v20i6 pp. 64, Proquest #120993020 3 pgs.

Atsuyuki Morishima, "Efficient Construction of Materialized XML Views With Silkroute", IPSJ SIG Notes, Japan, Information Processing Society of Japan, Jul. 17, 2001, vol. 2001, No. 70, pp. 421-428.

Butrico M A et al: "Gold Rush: Mobile Transaction Middleware With Java-Object Replication" Conference on Object'—Oriented Technologies, (Jun. 16, 1997), pp. 91-101.

M2 Presswire. Convergys: Genie Mobile chooses Geneva Billing software, continuing the momentum of the merger between Convergys and Geneva Technology. Coventry: Jun. 1, 2001, p. 1.

PR Newswire. China Unicorn Selects QUALCOMM's Brew Solution as Its Platform to Launch Wireless Data Applications. New York, Aug. 26, 2002, p. 1.

QUALCOMM; "Binary Runtime Environment for Wireless, Brew Application note: Developing Brew Applications for Devices with

(56) References Cited

OTHER PUBLICATIONS

RUIM Units" (Online) Jan. 10, 2005, pp. 1-11, XP002410586 San Diego Retrieved from the internet: URL:http://brew.qualcomm.com/brew_bnry/pdf/.
QUALCOMM; Brew Distribution System (BDS) Overview (online) 2003, pp. 1-17, XP002410587 San Diego Retrieved from the Internet: URL:http.wirelessknowledge.com/brew/images/about/pdf/bds.pdf> [retrieved on Dec. 6, 2006] the whole document.
SyncML Consortium: "SyncML Sync Protocol, Version 1.0" (Dec. 7, 2000), Chapters 1,2,5-8.
SyncML Consortium: "SyncML Sync Protocol, Version 1.0.1" (Jun. 15, 2001).
USA Group Selects Clikc-N-Done for Electronic Bill Presentment and Patment; Software Will Support Online Presentment and Payment for Education Loan Borrowers Business Editors, Internet Writers. Business Wire. New York: Apr. 24, 2000. p. 1.
International Search Report—PCT/US02/025749, International Search Authority—US, Jan. 22, 2003.
International Preliminary Examination Report—PCT/US02/025749, IPEA/US—Jun. 17, 2003.
Amendment dated Oct. 14, 2008, U.S. Appl. No. 11/141,934.
Amendment dated Aug. 8, 2007, U.S. Appl. No. 11/141,807.
Amendment dated Dec. 23, 2007, U.S. Appl. No. 11/141,807.
Anonymous, "BPM in Action: iUNIVERSE," Intelligent Enterprise, San Mateo, May 15, 2004, vol. 7, Issue 8, 2 pages (recovered from ProQuest on Jun. 5, 2009).
Business Wire, Informix Announces Key Customer Wins in Fourth Quarter; Leading Companies and Government Entities in Key Markets Around the World Respond to Informer's Technology Strategy Business/Technology Editors. Business Wire. New York: Jan. 27, 1999, p. 1.
Diebold Teams with Health System Services to Offer a Complete Distribution Package for Pharmacy Medication and Supplies PR Newswire. New York: May 28, 1998. p. 1.
European Search Report—EP02775703, European Patent Office—Jan. 25, 2008.
European Search Report—EP10009979, Search Authority—Munich Patent Office, Nov. 15, 2010.
European Search Report—EP10009987, Search Authority—Munich Patent Office, Nov. 15, 2010.
Fujii, H. "Brew application, flexibility in development comparable to PCs, powerful in enterprise system cooperation of cellular phones," Solution IT, vol. 14, No. 11, Japan, RIC Telecom, Nov. 1, 2002, pp. 22-24.
Office Action dated Jan. 7, 2009, U.S. Appl. No. 11/141,934.
Anonymous: "BREW TM Application Note: Developing BREW Applications for Devices with RUIM Units", May 14, 2005, May 14, 2005 (May 14, 2005), pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.
Anonymous: "Internet Archive Wayback Machine", Internet Citation, May 14, 2005 (May 14, 2005), p. 1, XP007920684, Retrieved from the Internet: URL:http://wayback.archive.org/web/200506150000007*/http://brew. qualcomm.com/brew_bnry/pdf/developer/resources/ds/Dev_BREW_Apps.pdf [retrieved on Jun. 4, 2012].
Classified Ad 3—No Title, New York Daily Times (1851-1857); Nov 15, 1853; ProQuest Historical Newspapers: The New York Times (1851-2008) p. 4.
Supplementary European Search Report—EP02775703—Search Authority—Munich—Oct. 8, 2007.
Telesens: TelesensKSCL and Comptel sign strategic agreement; New alliance expands best of suite billing offering and furthers drive towards comprehensive next generation solution for network service providers M2 Presswire, Coventry, Nov 28, 2000, p. 1.
Classified Ad 74—No Title. Chicago Daily Tribune (1923-1963); Oct 11, 1959; ProQuest Historical Newspapers: Chicago Tribune (1849-1989) p. G34.
"Ellipsus' Mobile Aplication Provisioning System", Internet Citation, Dec. 2, 2001 (Dec. 2, 2001), XP002266188, Retrieved from the Internet: URL: web.archive.orgfwww.ellipsus.com [retrieved on Jan. 7, 2004].
EPO: "Notice From the European Patent Office dated Oct. 1, 2007 Concerning Business Methods", Journal of the European Patent Office—vol. 30, No. 11, Nov. 1, 2007 (Nov. 1, 2007), pp. 592-593, XP007905525, ISSN: 0170-9291.
"How can wireless models help my business?", Computer Weekly, Dec. 2, 2003; p. 1-5, Available from: Business Source Complete, Ipswich, MA. Accessed Jul. 1, 2013.
McAuliffe W., "Broadband heading for move to metered billing", New Media Age, Apr. 29, 2004; p. 1, Available from: Business Source Complete, Ipswich, MA. Accessed Jul. 1, 2013.
Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000 (Apr. 10, 2000), pp. 1-4, XP010538894, ISBN: 0-7803-6364-7.
Floyd R, et al., "Mobile Web Access Using ENetwork Web Express", IEEE Personal Communications, IEEE Communications Society, US, vol. 5, No. 5, Oct. 1, 1998 (Oct. 1, 1998), pp. 47-52, XP000786616.
Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

* cited by examiner

| Application | Client ID | Client Phone No. | Phone Model | Carrier | Region | Download Date | Deleted |
|---|---|---|---|---|---|---|---|
| Chess | 9002x | (111) 111-1111 | SonyTM 3250 | ATTTM | CA | 16Dec2000 | 0 |
| Golf Score Keeper | 9003x | (222) 222-2222 | SamsungTM 9840 | VerizonTM | CA | 3May2000 | 0 |
| Stock Monitor | 9004x | (333) 333-3333 | QwestTM 2001 | QRSTU | NV | 4Sep2000 | 1 |

SYSTEM AND METHOD FOR PROVIDING SUBSCRIBED APPLICATIONS ON WIRELESS DEVICES OVER A WIRELESS NETWORK

CROSS-REFERENCE TO RELATED APPLICATIONS

This is a continuation application of application Ser. No. 09/929,220 filed Aug. 31, 2001 (now allowed and issue fee paid), the contents of which are hereby incorporated by reference.

BACKGROUND OF THE INVENTION

I. Field of the Invention

The present invention generally relates to data networks and computer communications across the data networks. More particularly, the invention relates to the provision of software applications that require a subscription for authorized use thereof being installed on wireless devices from one or more application download servers on a wireless data network, and the subscription is automatically accounted for on a server-side accounting module until the subscribed application is deleted from the wireless device.

II. Description of the Related Art

Wireless devices, such as cellular telephones, communicate packets including voice and data over a wireless network. Cellular telephones themselves are being manufactured with increased computing capabilities and are becoming tantamount to personal computers and hand-held personal digital assistants ("PDAs"). These "smart" cellular telephone have installed application programming interfaces ("APIs") onto their local computer platform that allow software developers to create software applications that operate on the cellular telephone. The API sits between the wireless device system software and the software application, making the cellular telephone functionality available to the application without requiring the software developer to have the specific cellular telephone system source code.

The software applications can come pre-loaded at the time the wireless telephone is manufactured, or the user may later request that additional programs be downloaded over cellular telecommunication carrier networks, where the programs are executable on the wireless telephone. As a result, users of wireless telephones can customize their wireless telephones with programs, such as games, printed media, stock updates, news, or any other type of information or program available for download through the wireless network. Some of the software applications are downloadable to the user only if the user has a paid a fee to the provider of the software applications. And in some existing computer networks, software applications are only downloadable if the user subscribes to the use of the software application such that the user is billed at periodic intervals for the use of the application.

The provider typically insures that only authorized users have access to cost-based applications through the provision of licenses within the software application itself. The wireless device API normally checks the software either at the time execution is requested or at some other period to determine if the software is licensed for use on the computer platform of the wireless device. As long as the license is current, the software application can be executed on the platform. However, most software licenses have a finite duration for which they will permit the user to have access to the licensed application. For some applications, the license is of a lasting duration and the user is billed for the application based upon the date when the application was downloaded.

In existing wireless networks, if the user of the wireless device desires to download and use a subscription-based software application, the user will typically either call a service provider or contact the service provider through other means, such as through an Internet access, and the service provider will either transmit the subscribed application to the wireless device across the wireless network or allow the user access to secure site where the subscription-based application is downloadable or accessible. To end the subscription of the application that has been downloaded to or is accessible from the wireless device, the user typically has to make an affirmative step to end the subscription, such as contacting the service provider from the wireless device, which can be expensive, or waiting until a less expensive connection can be made, such as from a land-based telephone line or an Internet connection.

Accordingly, it would be advantageous to provide a system and method whereby a subscription-based software application can be downloaded to wireless devices and accounted for by the application provider, while still permitting the user easy removal of the subscription-based application with virtually concurrent cessation of billing for the application subscription. Further, such subscription-based software application should be easily removed from the wireless device without significant action required by the user of the wireless device to contact the software application provider to have the subscription discontinued. It is thus to the provision of such a system and method that can account for the use of subscription-based software applications on wireless devices that the present invention is primarily directed.

SUMMARY OF THE INVENTION

The present invention is a system and method for the provision of downloadable subscription-based software applications on one or more wireless devices where the applications were downloaded from one or more application download servers across a wireless network. The subscription-based software application can be treated as a regular application resident on the wireless device, or alternately, the subscription-based application can include a license indicating that the application is subscription-based. An accounting module receives subscription-based application download data from the one or more application download servers for each subscription-based application downloaded by a wireless device, and subscription-based application deletion data from each wireless device that has deleted a subscription-based application. The system includes one or more wireless devices, such as a cellular telephone, personal digital assistant (PDA), pager, or other wireless computer platform. Each wireless device is in selective communication with a wireless network, such as a cellular network, and the wireless device can selectively download one or more subscription-based software applications, such as a game, news feed, stock quotes, or the like, whereby the subscription-based application is installed and executable on the wireless device.

The system also includes one or more application download servers where each application download server selectively communicates with the one or more wireless devices across the wireless network and, in response to requests from the wireless devices, downloads to wireless devices subscription-based software applications. Each application download server generates application download data for each subscription-based software application downloaded by a wireless device therefrom for tracking which wireless device downloaded which subscription-based application.

The accounting module, preferably implemented in software, accounts for the use of subscription-based software applications by each wireless device based upon the subscription-based software application download data received from the application download servers and subscription-based application deletion data received from the wireless devices. The accounting module can be resident on either one of the application download servers, the application download server from which a subscription-based software application was downloaded, or on any computer platform on the wireless network or server-side network.

In one embodiment, upon deletion of a subscription-based software application, the wireless device bridges a communication link with the one or more application download servers and transmits subscription-based application deletion data to the one or more download servers, which in turn transmit the deletion data to the accounting module if the accounting module is not resident on that server. Alternately, the accounting module selectively receives subscription-based application deletion data transmitted directly from a wireless device.

The invention also includes a method for providing downloadable subscription-based software on the one or more wireless devices in selective communication with one or more application download servers across a wireless network including the steps of selectively downloading one or more subscription-based software applications from an application download server to a wireless device whereby the subscription-based software is executable on the wireless device, and then generating at the application download server subscription-based application download data for each subscription-based software application downloaded by a wireless device therefrom. The method then includes the steps of selectively transmitting subscription-based application deletion data from each wireless device that has deleted a subscription-based software application to the accounting module, and accounting for the use of subscription-based software applications by each wireless device on the accounting module where the accounting is based upon the subscription-based software application download data and subscription-based application deletion data. The method also further preferably includes the step of, prior to the step of selectively transmitting subscription-based application deletion data from each wireless device, the wireless device bridging a communication link to the one or more application download servers after the wireless device has deleted a subscription-based software application. An example of bridging a communication link is effecting a cellular teleconnection.

The step of accounting for the use of subscription-based software applications by each wireless device can occur on an accounting module resident on the application download server from which a subscription-based software application was downloaded, on an accounting module resident on an application download server, or on an accounting module located remotely from the application download servers.

In one embodiment, the method can further include the step of receiving the transmitted subscription-based application deletion data at an application download server and sending the subscription-based application deletion data to the accounting module for the accounting step. Alternately, the step of selectively transmitting subscription-based application deletion data from each wireless device to an accounting module can be selectively transmitting subscription-based application deletion data from each wireless device directly to the accounting module located remotely from the one or more application download servers.

The invention also provides an accounting module specifically for accounting for the use of the subscription-based software application by the one or more wireless devices. The accounting is performed primarily based upon subscription-based application download data supplied from each application download server for each subscription-based software application downloaded by a wireless device therefrom, and subscription-based application deletion data supplied from each wireless device that has deleted a subscription-based software application.

It is therefore the primary object of the present invention to provide a system and method whereby a subscription-based software application can be downloaded to wireless device from one or more application download servers, and the wireless devices provides data indicative of deletion of the subscription-based application such that the use of the subscribed applications can be accounted for by the application provider without having to constantly determine if the subscription-based application is present on the wireless device. Further, the user can easily delete the subscription-based application and cause virtually concurrent cessation of billing for the application subscription. The present invention thus provides an advantage to the user of the wireless device in that the subscription-based software application can be easily removed from the wireless device without significant action taken by the user of the wireless device to contact the software application provider to have the subscription discontinued.

Other objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
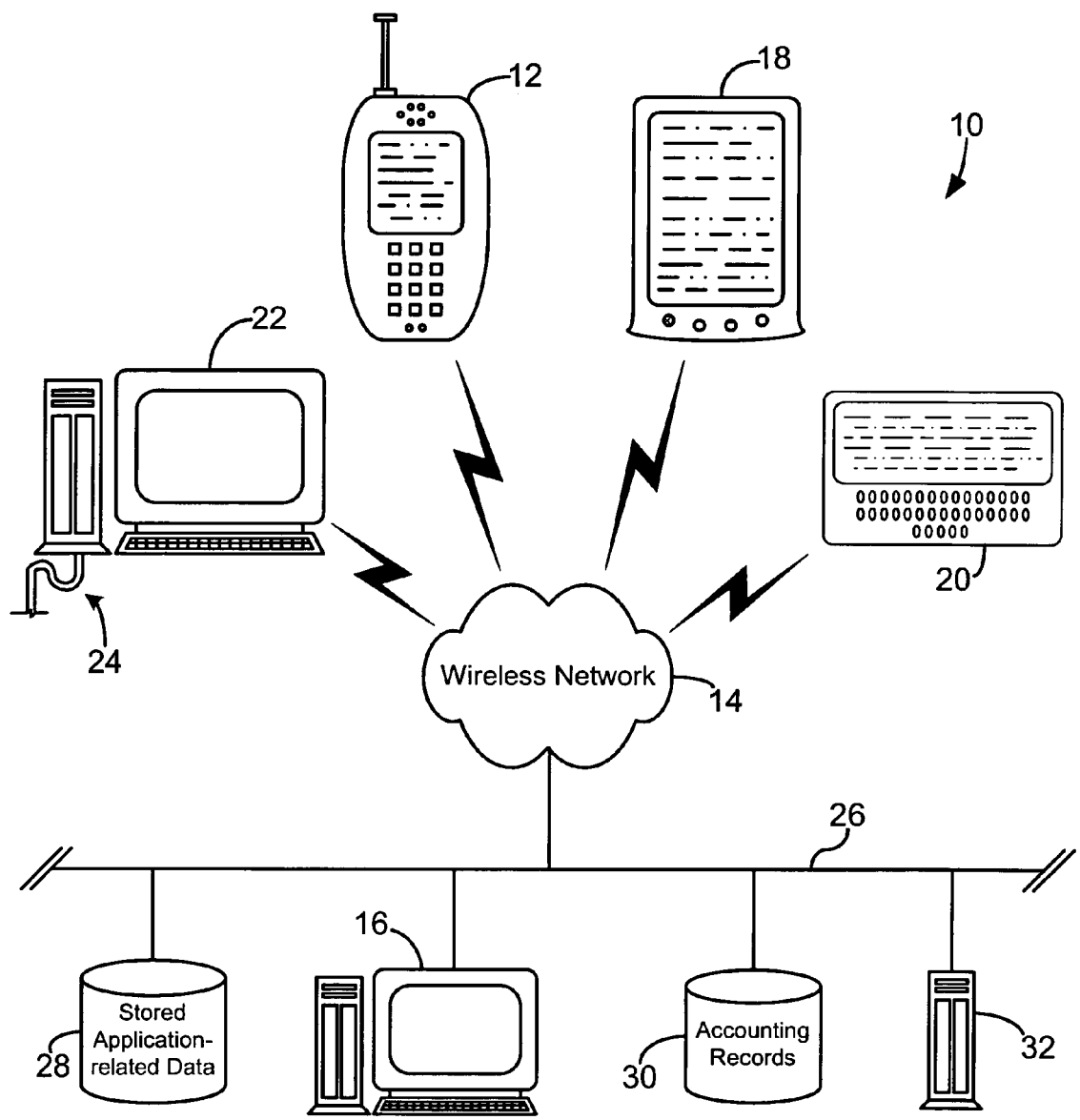
FIG. 1 is a representative diagram of a wireless network and the computer hardware and wireless devices that can be used within the inventive system.

With reference to the figures in which like numerals represent like elements throughout, FIG. 1 illustrates the present inventive system 10 for providing subscribed software applications to one or more wireless devices, such as cellular telephone 12, in communication across a wireless network 14 with at least one application download server 16 that selectively downloads subscribed software applications to the wireless devices across a wireless communication portal or other data access to the wireless network 14. As shown here, the wireless device can be a cellular telephone 12, a personal digital assistant 18, a pager 20 which is shown here as a two-way text pager, or even a separate computer platform 22 that has a wireless communication portal, and may otherwise have a wired connection 24 to a network or the Internet. The inventive system 10 can thus be performed on any form of remote module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14. There is also shown a stand-alone accounting server 32 and a accounting records database 30 which perform the accounting functions as herein described; however, accounting server 32 and database 30 are not necessary as all server-side functions can be performed on one server, such as application download server 16. Further, any computer server-side computer platform can provide separate services and processes to the wireless devices 12,18,20,22 across the wireless network 14.

The stored-application-related database 28 preferably contains stored-application related data to include the records for the specific applications downloaded by specific wireless devices 12,18,20,22, from the server through the wireless network 14. The records can then be used to generate the subscription-based download data requisite to bill the users of the wireless devices for the applications downloaded thereto.

Figure 2:
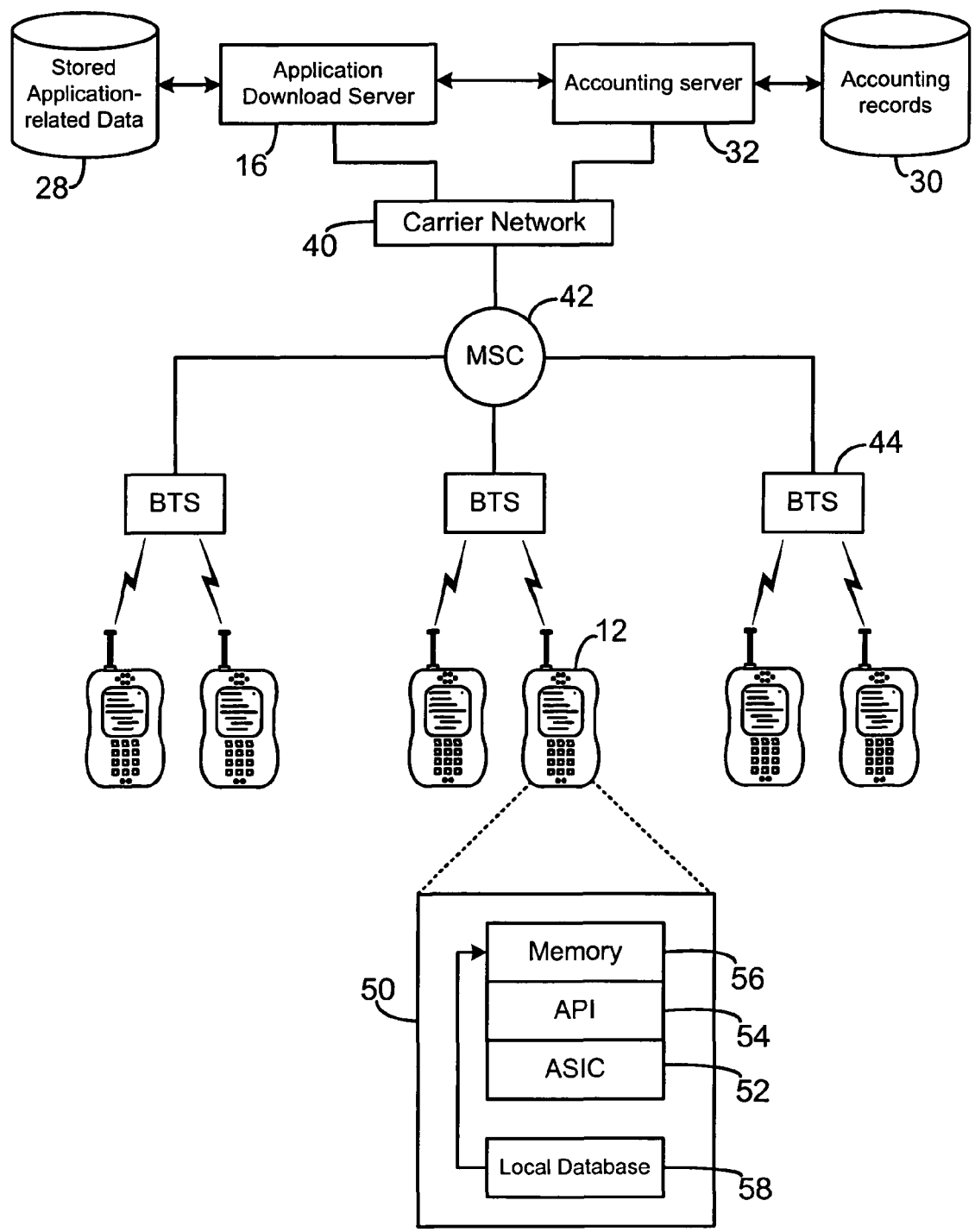
FIG. 2 is a block diagram of the hardware components of the wireless network providing communication between different wireless devices, the application download server, the accounting server, and their respective databases.

In FIG. 2, a block diagram is shown that more fully illustrates the components of the wireless network 14 and interrelation of the elements of the present inventive system 10. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The application download server 16 and the stored application-related database 28, and accounting server 32 and accounting records database 30, and any other components which are needed top provide cellular telecommunication services. The application download server 16 and/or accounting server 32 communicate with a carrier network 40, through a data link, such as the Internet, a secure LAN, WAN, or other network. The carrier network 40 controls messages (sent as data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations "BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications transmitted from the application download server 16. The computer platform 50 includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold applications not actively used in memory 56, such as the subscription-based software applications downloaded from the application download server 16. The local database 58 is typically a flash memory cell, but can be any secondary or tertiary storage device as known in the art, such as magnetic media, EPROM, EEPROM, optical media, tape, or soft or hard disk.

The wireless device, such as cellular telephone 12, can download subscription-based applications, such as games, news, sports data, stock monitors, and the like, to be held the local database 58 when not in use. The subscription-based software application can be treated as a regular software application resident on the wireless device 12,18,20,22, and the only way to access the application to obtain a subscription to have download access to the application on the application download server 16. Alternately, the subscription-based application can include a license indicating that the application is subscription-based. The wireless device can then selectively upload stored resident applications, to include subscription-based applications, from the local database 58 to memory 56 for execution on the API 54 when so desired by the user. The user of the wireless device 12,18,20,22 can also selectively delete a software application from the local database, and if the software application was subscription-based, the application provider for use of the subscribed software application should no longer charge the user. Thus, the deletion of the subscription-based application must be communicated to the accounting module.

The system 10 uses an accounting module to account for the use of the subscription-based application based upon the date when the wireless device 12,18,20,22 downloaded the application, and the date when the wireless device deletes the software-application. The accounting module, which is preferably a software application that can be a stand-along module or can be integrated into a larger software application, receives subscription-based application download data from the one or more application download servers, such as server 16, for each subscription-based application downloaded by a wireless device 12,18,20,22, and subscription-based application deletion data from each wireless device 12,18,20,22 that has deleted a subscription-based application. In such manner, the usage of the subscribed application can be billed solely based upon the download date and deletion date of the subscribed application. Although, other downloads and interconnections can be made between the application download server 16 and the wireless device 12,18,20,22, such as updating the application, and such interconnection can update the accounting records database 30. The accounting module can be resident the application download server 16, and specifically the application download server 16 from which a subscription-based software application was downloaded, or can be resident on any computer platform resident on the server-side network 26 or wireless network 14.

Figures 3, 4A, 4B:
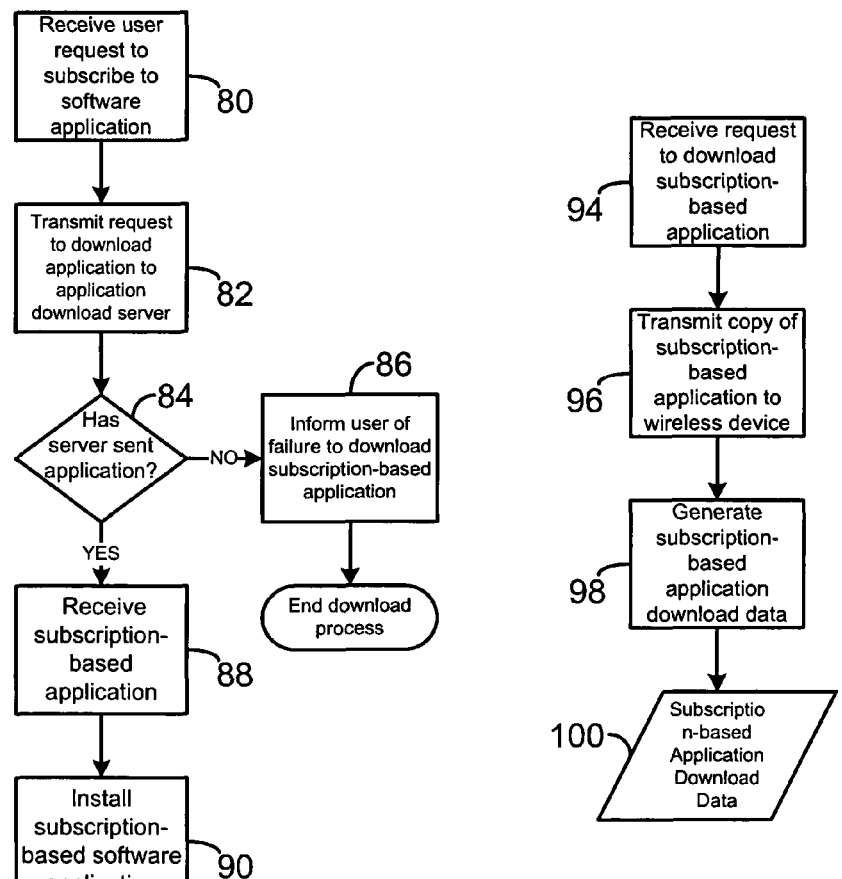
FIG. 3 is a file table resident on the application download server and/or stored application-related database identifying the software applications that are downloaded and/or deleted on specific wireless devices.
FIG. 4A is a flowchart illustrating the process on a wireless device of downloading and installing a subscription-based software application.
FIG. 4B is a flowchart illustrating the process at the application download server in transmitting a copy of a subscribed software application to the wireless device, this process in conjunction with the process of FIG. 4A on the wireless device.

FIG. 3 illustrates a table 60 of the subscription-based application data held resident on the application download server 16 or stored application-related database 28, and which is sent to the accounting module wherever resident in the system 10. The application column 62 holds three software applications, shown here as chess, a golf score keeper, and a stock monitor, and the specific client identification number 64 that has downloaded the particular application. The table 60 also has other client and application related data, such as the client phone number 66, the specific phone model 68, the carrier for telecommunication service 70, and the region of the carrier 72. The table 60 also includes the download date column 74 containing the specific dates the applications were downloaded. The table 60 also includes an optional deletion column 76 such that the application download server can track if the wireless device deleted a specific application, from application column 62. The deletion column 76 includes a single bit wherein 0 indicates that no deletion signals has been received, and 1 indicates that the user has deleted the application. Thus, the stock monitor application in table 60 has been deleted by the wireless device. The application download server 16 can keep the date of deletion if necessary, but at the least, relays the deletion data to the accounting module so that proper accounting for the duration of the subscription of the application can occur. The table 60 can be held in any relational, entity-relational, or object-oriented database on the application download server 16 or on the stored application-related database 28.

As shown in FIG. 4A, in operation of the system 10, the wireless device 12,18,20,22 receives a request to subscribe to a software application, as shown at step 80, and then the wireless device transmits a request to the application download server 16, as shown at step 82, to have the application subscribed to and downloaded. The application download server 16, as shown in FIG. 4B, receives the request to download the subscription-based application, as shown at step 94, transmits a copy of the subscription-based application to the wireless device, as shown at step 96. Either at the same time as step 96 or at some time thereafter, the application download server 16 generates the subscription-based application download data, as shown at step 98, and then outputs the subscription-based application download data, as shown as data 100.

On the wireless device side, a determination is made as to whether the application download server has transmitted the application, as shown at decision 34. If the application has not been sent, then the user is informed of the failure to download the subscription-based application download data, as shown at step 86, and then the download process terminates. Otherwise, if the application download server 16 has sent the subscription-based application at decision 84, then the wireless device 12,18,20,22 receives the subscription-based application, as shown at step 88, and the subscription-based application is installed on the wireless device, as shown at step 90, and the downloaded process terminates. In downloading the application, the wireless device 12,18,20,22 has subscribed to the application and the user/owner of the wireless device will be billed under whatever terms the subscription entails, which is typically a recurrent periodic fee.

Figure 5:
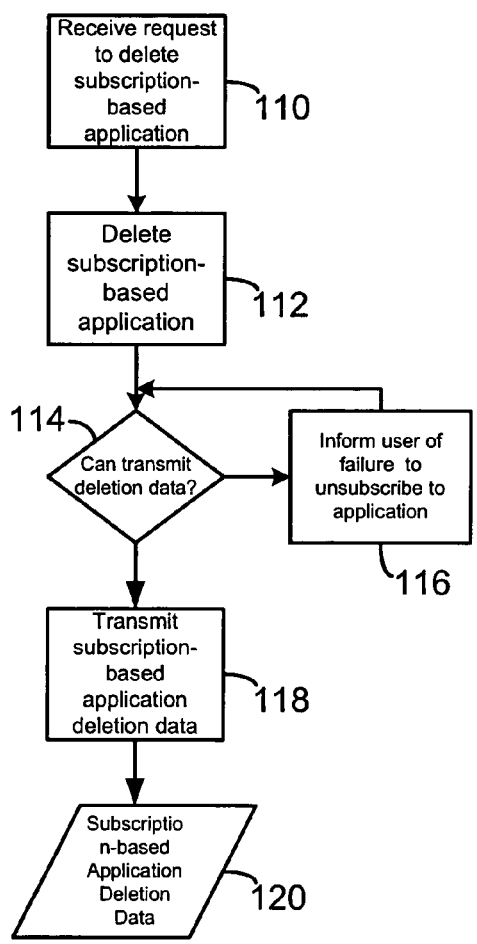
FIG. 5 is a flowchart illustrating the process of the wireless device deleting a subscription-based application and transmitting the subscription-based application deletion data indicative of the deletion to the accounting module, either directly or indirectly.

With reference to FIG. 5, when the user desires to remove the subscription-based application from the wireless device 12,18,20,22, the wireless device receives the request from the user to delete the application, as shown at step 110, and then the wireless device deletes the subscription-based application completely from the wireless device, i.e. deleted from local database 58 and memory 56. The wireless device then attempts to transmit, at the same time as step 112 or thereafter, the subscription-based application deletion data to the accounting module, and determines if the transmission as possible, as shown at decision 114. In other words, the wireless device must communicate the fact of the deletion of the application in order to have the user stopped being charged for the subscription, and for example, if the wireless device is out of the wireless network, then the wireless device must wait until back in network in order to communicate the subscription-based application deletion data. Thus, if the wireless device cannot transmit the deletion data at decision 114, the user is informed of the failure to unsubscribe from the application and the device enters a wait state at decision 114 until the subscription-based application deletion data can be transmitted. Once the deletion data can be transmitted at decision 114, then the subscription-based application deletion data is transmitted from the wireless device, as shown at step 118, and the process terminates with the output of the subscription-based application deletion data, as shown as data 120.

Figure 6:
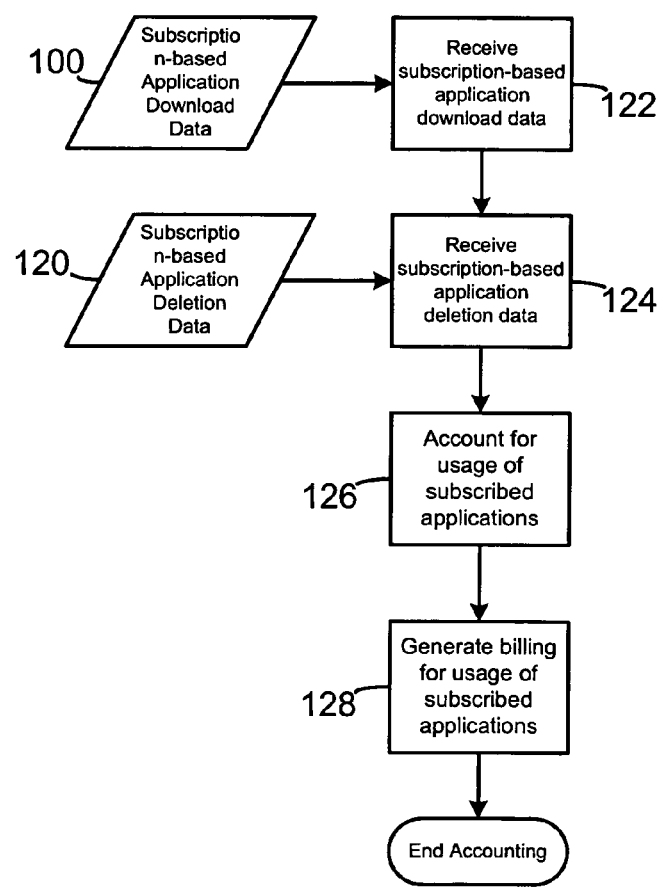
FIG. 6 is a flowchart illustrating the accounting module's process of accounting for usage of subscribed software applications based upon the subscription-based application download data and subscription-based application deletion data.

The accounting method of the accounting module is shown in the flowchart of FIG. 6. The accounting module, wherever resident, receives the subscription-based application download data 100 from one or more application download servers, such as application download server 16, as shown at step 122, and also receives the subscription-based application deletion data 120 from the one or more wireless devices 12,18,20,22, as shown at step 124. The particular order of receipt of the data is irrelevant as long as both data are present so that the accounting process can occur. As shown at step 126, the accounting module then accounts for the usage of subscribed applications by the wireless devices based upon the download date and deletion data for each application. The accounting module then generates billing information for usage of the subscribed applications, as shown at step 128, and then the accounting process terminates. The accounting module perform a wide variety of accounting functions such as generation of simple billing information to full generation of the actual bill to the user/owner of the wireless device.

In order to transmit the subscription-based application deletion data, the wireless device 12,18,20,22 preferably bridges a communication link to the one or more application download servers, such as application download server 16, such as making a cellular teleconnection to a server. The receiving application download server 16 then forwards the deletion data to the accounting module for processing as shown in FIG. 6. Alternately, the transmission of the subscription-based application deletion data from each wireless device 12,18,20,22 to the accounting module can be direct to the accounting module located remotely from the one or more application download servers, such as a separate accounting server 32.

In view of the inventive method and module, the present invention includes a program resident in a computer readable medium, where the program directs a wireless device having a computer platform to perform the inventive steps of the method. The computer readable medium can be the memory 56 of the computer platform 50 of the cellular telephone 12, or other wireless device, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

In the context of FIGS. 4A-6, the present inventive methods may be implemented, for example, by operating portion(s) of the wireless network 14 to execute a sequence of machine-readable instructions, such as wireless platform 50, the application download servers 16, and accounting server 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of operating a computer system that is configured to provide downloadable subscription-based software applications across a wireless network, comprising:
   receiving a subscription-based application download data at the computer system from an application download server corresponding to a download from the application download server to a wireless device of a subscription-based software application;
   receiving, at the computer system over the wireless network, a subscription-based application deletion data passively transmitted in response to a deletion from the wireless device of a corresponding subscription-based software application;
   calculating at the computer system a subscription fee associated with a usage of said corresponding subscription-based software application between said download and said deletion; and
   transmitting said subscription fee from the computer system to a billing module of said computer system.

2. The method of claim 1 wherein said wireless network is a packet switching network.

3. The method of claim 1, wherein the subscription-based software application is a software program.

4. The method of claim 1 wherein the subscription-based application download data contains information to cause said billing module to initiate subscription billing for a user regarding the subscription-based software application, and the subscription-based application deletion data contains information to end subscription billing for the user regarding the subscription-based software application.

5. The method of claim 1, wherein the subscription-based software application is audio-visual content.

6. The method of claim 5, wherein said audio-visual content comprise news.

7. The method of claim 5, wherein said audio-visual content comprise sports data.

8. A method of operating a computer system that is configured to provide downloadable subscription-based software applications across a wireless network, comprising:
   receiving, at the computer system over the wireless network, a subscription-based application download data corresponding to a download of a subscription-based software application;
   receiving, at the computer system over the wireless network, a subscription-based application deletion data passively transmitted in response to a deletion of the corresponding subscription-based software application;
   calculating at the computer system a subscription fee associated with a usage of said corresponding subscription-based software application between said download and said deletion; and
   subscription billing at the computer system for said subscription fee associated with the usage of said corresponding subscription-based software application between said download and said deletion.

9. The method of claim 8, wherein the subscription-based application download data is received from a download server.

10. The method of claim 8, wherein the subscription-based application download data corresponds to the download of the subscription-based software application from an application download server to a wireless device.

11. The method of claim 8, wherein the subscription-based application download data contains information to cause said accounting module to initiate subscription billing for a user regarding the subscription-based software application, and the subscription-based application deletion data contains information to end subscription billing for the user regarding the subscription-based software application.

12. A system for providing downloadable subscription-based software applications across a wireless network, comprising:
   means for receiving, over the wireless network, a subscription-based application download data corresponding to a download of a subscription-based software application;
   means for receiving, over the wireless network, a subscription-based application deletion data passively transmitted in response to a deletion of the corresponding subscription-based software application;
   means for calculating a subscription fee associated with a usage of said corresponding subscription-based software application between said download and said deletion; and
   means for subscription billing for the usage of said corresponding subscription-based software application.

13. An apparatus for providing downloadable subscription-based software applications across a wireless network, comprising:
   a computer platform including a processor and a memory; and
   an accounting module stored in memory and executable by the processor, the accounting module operable to:

receive, over the wireless network, a subscription-based application download data corresponding to a download of a subscription-based software application;

receive, over the wireless network, a subscription-based application deletion data passively transmitted in response to a deletion of the corresponding subscription-based software application;

calculate a subscription fee associated with a usage of said corresponding subscription-based software application between said download and said deletion; and subscription bill for the usage of said corresponding subscription-based software application.

14. The apparatus of claim 13, wherein the subscription-based application download data is received from a download server.

15. The apparatus of claim 13, wherein the subscription-based application download data corresponds to the download of the subscription-based software application from an application download server to a wireless device.

16. The apparatus of claim 13 wherein the subscription-based application download data contains information to cause said accounting module to initiate subscription billing for a user regarding the subscription-based software application, and the subscription-based application deletion data contains information to end subscription billing for the user regarding the subscription-based software application.

17. A non-transitory computer-readable medium encoded with an accounting module computer program comprising instructions, which, when executed by a processor of a computer, cause the computer to perform operations, the instructions comprising:

at least one instruction for receiving, over a wireless network, a subscription-based application download data corresponding to a download of a subscription-based software application;

at least one instruction for receiving, over the wireless network, a subscription-based application deletion data passively transmitted in response to a deletion of the corresponding subscription-based software application;

at least one instruction for calculating a subscription fee associated with a usage of said corresponding subscription-based software application between said download and said deletion; and at least one instruction for subscription billing for said subscription fee associated with the usage of said corresponding subscription-based software application between said download and said deletion.

18. The non-transitory computer-readable medium of claim 17, wherein the subscription-based application download data is received from a download server.

19. The non-transitory computer-readable medium of claim 17, wherein the subscription-based application download data corresponds to the download of the subscription-based software application from an application download server to a wireless device.

20. The non-transitory computer-readable medium of claim 17, wherein the subscription-based application download data contains information to cause said accounting module computer program to initiate subscription billing for a user regarding the subscription-based software application, and the subscription-based application deletion data contains information to end subscription billing for the user regarding the subscription-based software application.

21. A method of operating a wireless device configured to facilitate management of downloadable subscription-based software applications across a wireless network, the method comprising:

receiving, over the wireless network, at the wireless device, a subscription-based software application;

receiving, at the wireless device, a user generated request identifying the subscription-based software application to delete;

deleting, from the wireless device, the subscription-based software application identified in the user generated request; and passively transmitting over the wireless network, from the wireless device, subscription-based application deletion data associated with the subscription-based software application identified in the user generated request, wherein the user generated request and/or the subscription-based application deletion data are further configured to terminate subscription billing for the subscription-based software application.

22. The method of claim 21, wherein the wireless network, over which the subscription-based application deletion data is transmitted, is a packet-switching network.

23. The method of claim 21, wherein the subscription-based software application is a software program.

24. The method of claim 21, wherein the subscription-based application deletion data is sent to an accounting module.

25. The method of claim 21, wherein the passively transmitting is triggered by the deleting and is not triggered by a user-initiated request to transmit the subscription-based application deletion data.

26. The method of claim 21, further comprising:

determining that the passively transmitting has failed such that the subscription-based application deletion data did not successfully arrive at an intended destination server over the wireless network; and notifying a user of the wireless device that the user is still being charged for the subscription-based software application despite the subscription-based software application being deleted from the wireless device by the deleting.

27. A wireless device configured to manage downloadable subscription-based software applications across a wireless network, comprising:

means for receiving, over the wireless network, a subscription-based software application;

means for receiving a user generated request identifying the subscription-based software application to delete;

means for deleting the subscription-based software application identified in the user generated request; and means for passively transmitting, over the wireless network, subscription-based application deletion data associated with the subscription-based software application identified in the user generated request, wherein the user generated request and/or the subscription-based application deletion data are further configured to terminate subscription billing for the subscription-based software application.

28. A wireless device configured to manage downloadable subscription-based software applications across a wireless network, comprising:

a computer platform including a processor and a memory configured to:

receive, over the wireless network, a subscription-based software application;

receive a user generated request identifying the subscription-based software application to delete;

delete the subscription-based software application identified in the user generated request; and passively transmit, over the wireless network, subscription-based application deletion data associated with the subscription-based software application identified in the user generated request, wherein the user generated request and/or the subscription-based application deletion data are further configured to terminate subscription billing for the subscription-based software application.

29. A non-transitory computer-readable medium encoded with an accounting module computer program comprising instructions, which, when executed by a wireless device configured to manage downloadable subscription-based software applications across a wireless network, cause the wireless device to perform operations, the instructions comprising:

at least one instruction for receiving, at the wireless device over the wireless network, a subscription-based software application;

at least one instruction for receiving at the wireless device a user generated request identifying the subscription-based software application to delete;

at least one instruction for deleting at the wireless device the subscription-based software application identified in the user generated request; and at least one instruction for passively transmitting, from the wireless device over the wireless network, subscription-based application deletion data associated with the subscription-based software application identified in the user generated request, wherein the user generated request and/or the subscription-based application deletion data are further configured to terminate subscription billing for the subscription-based software application.

* * * * *